(12) United States Patent
Bendyk et al.

(10) Patent No.: US 8,176,222 B2
(45) Date of Patent: May 8, 2012

(54) EARLY TERMINATION OF AN I/O OPERATION IN AN I/O PROCESSING SYSTEM

(75) Inventors: Mark P. Bendyk, Hyde Park, NY (US); Scott M. Carlson, Tucson, AZ (US); Daniel F. Casper, Poughkeepsie, NY (US); John R. Flanagan, Poughkeepsie, NY (US); Catherine C. Huang, Poughkeepsie, NY (US); Matthew J. Kalos, Tucson, AZ (US); Ughochukwu C. Njoku, Yonkers, NY (US); Louis W. Ricci, Hyde Park, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 12/030,932

(22) Filed: Feb. 14, 2008

(65) Prior Publication Data
US 2009/0210580 A1 Aug. 20, 2009

(51) Int. Cl.
*G06F 13/10* (2006.01)
*G06F 13/14* (2006.01)
*G06F 13/38* (2006.01)
*G06F 11/07* (2006.01)

(52) U.S. Cl. ............... 710/32; 710/5; 714/3; 714/4.1; 714/5.1; 714/6.1

(58) Field of Classification Search .................. None
See application file for complete search history.

(56) References Cited

U.S. PATENT DOCUMENTS

| | | | |
|---|---|---|---|
| 3,943,283 A | 3/1976 | Caragliano et al. |
| 4,004,277 A | 1/1977 | Gavril |
| 4,374,415 A | 2/1983 | Cormier et al. |
| 4,380,046 A | 4/1983 | Frosch et al. |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |

(Continued)

FOREIGN PATENT DOCUMENTS
DE 3931514 3/1990
(Continued)

OTHER PUBLICATIONS

Fibre Channel Single-Byte Command Code Sets-3 Mapping Protoco (FC-SB-3)I, T11/Project 1357-D/Rev 1.6, INCITS, Mar. 2003.*

(Continued)

*Primary Examiner* — Ilwoo Park
(74) *Attorney, Agent, or Firm* — Cantor Colburn LLP; John Campbell

(57) ABSTRACT

A computer program product, apparatus, and method for handling early termination of an I/O operation at a channel subsystem in an I/O processing system are provided. The computer program product includes a tangible storage medium readable by a processing circuit and storing instructions for execution by the processing circuit for performing a method. The method includes receiving a request to terminate an I/O operation, and transmitting an abort command to a control unit in communication with the channel subsystem in response to receiving the request to terminate the I/O operation. The method also includes transmitting a purge path command to purge a path associated with the I/O operation, where the purge path command includes an error code identifying the request to terminate the I/O operation.

36 Claims, 11 Drawing Sheets

U.S. PATENT DOCUMENTS

| | | | |
|---|---|---|---|
| 4,866,609 A | 9/1989 | Calta et al. | |
| 4,870,566 A | 9/1989 | Cooper et al. | |
| 5,016,160 A | 5/1991 | Lambeth et al. | |
| 5,031,091 A | 7/1991 | Wakatsuki et al. | |
| 5,040,108 A | 8/1991 | Kanazawa | |
| 5,386,512 A | 1/1995 | Crisman et al. | |
| 5,388,219 A | 2/1995 | Chan et al. | |
| 5,410,727 A | 4/1995 | Jaffe et al. | |
| 5,434,980 A | 7/1995 | Casper et al. | |
| 5,440,729 A | 8/1995 | Kimura et al. | |
| 5,461,721 A | 10/1995 | Cormier et al. | |
| 5,463,736 A | 10/1995 | Elko et al. | |
| 5,465,359 A | 11/1995 | Allen et al. | |
| 5,500,942 A | 3/1996 | Eickemeyer et al. | |
| 5,526,484 A | 6/1996 | Casper et al. | |
| 5,528,755 A | 6/1996 | Beardsley et al. | |
| 5,539,918 A | 7/1996 | Allen et al. | |
| 5,546,533 A | 8/1996 | Koyama | |
| 5,561,809 A | 10/1996 | Elko et al. | |
| 5,584,039 A * | 12/1996 | Johnson et al. | 710/6 |
| 5,600,793 A | 2/1997 | Nord | |
| 5,608,898 A | 3/1997 | Turpin et al. | |
| 5,613,163 A | 3/1997 | Marron et al. | |
| 5,640,600 A | 6/1997 | Satoh et al. | |
| 5,758,190 A | 5/1998 | Johnson et al. | |
| 5,768,620 A | 6/1998 | Johnson et al. | |
| 5,831,985 A | 11/1998 | Sandorfi | |
| 5,860,022 A | 1/1999 | Kondou et al. | |
| 5,894,583 A | 4/1999 | Johnson et al. | |
| 5,901,327 A | 5/1999 | Ofek | |
| 5,918,028 A | 6/1999 | Silverthorn et al. | |
| 6,125,399 A | 9/2000 | Hamilton | |
| 6,202,095 B1 | 3/2001 | Beardsley et al. | |
| 6,230,218 B1 | 5/2001 | Casper et al. | |
| 6,343,335 B1 | 1/2002 | Dahman et al. | |
| 6,347,334 B1 | 2/2002 | Fredericks et al. | |
| 6,353,612 B1 | 3/2002 | Zhu et al. | |
| 6,484,217 B1 | 11/2002 | Fuente et al. | |
| 6,546,435 B1 | 4/2003 | Yoshimura et al. | |
| 6,584,511 B1 | 6/2003 | Marsh, III et al. | |
| 6,609,161 B1 | 8/2003 | Young | |
| 6,647,016 B1 * | 11/2003 | Isoda et al. | 370/412 |
| 6,651,125 B2 | 11/2003 | Maergner et al. | |
| 6,654,954 B1 | 11/2003 | Hicks | |
| 6,658,603 B1 | 12/2003 | Ward | |
| 6,693,880 B2 | 2/2004 | Gregg et al. | |
| 6,694,390 B1 | 2/2004 | Bogin et al. | |
| 6,751,680 B2 | 6/2004 | Langerman et al. | |
| 6,772,207 B1 | 8/2004 | Dorn et al. | |
| 6,826,661 B2 | 11/2004 | Umbehocker et al. | |
| 6,839,773 B2 | 1/2005 | Vishlitzky et al. | |
| 6,862,322 B1 | 3/2005 | Ewen et al. | |
| 6,898,202 B2 | 5/2005 | Gallagher et al. | |
| 6,915,378 B2 | 7/2005 | Roberti | |
| 6,963,940 B1 | 11/2005 | Glassen et al. | |
| 7,000,036 B2 | 2/2006 | Carlson et al. | |
| 7,003,700 B2 | 2/2006 | Elko et al. | |
| 7,020,810 B2 | 3/2006 | Holman | |
| 7,035,540 B2 | 4/2006 | Finan et al. | |
| 7,058,735 B2 | 6/2006 | Spencer | |
| 7,100,096 B2 | 8/2006 | Webb, Jr. et al. | |
| 7,111,130 B2 | 9/2006 | Blake et al. | |
| 7,120,728 B2 | 10/2006 | Krakirian et al. | |
| 7,124,207 B1 | 10/2006 | Lee et al. | |
| 7,133,988 B2 | 11/2006 | Fujibayashi | |
| 7,149,823 B2 | 12/2006 | Miller et al. | |
| 7,164,425 B2 | 1/2007 | Kwak et al. | |
| 7,202,801 B2 | 4/2007 | Chou | |
| 7,277,387 B2 | 10/2007 | Sanders et al. | |
| 7,315,911 B2 | 1/2008 | Davies et al. | |
| 7,382,733 B2 | 6/2008 | Banerjee et al. | |
| 7,395,284 B2 | 7/2008 | Sato et al. | |
| 7,398,335 B2 | 7/2008 | Sonksen et al. | |
| 7,484,021 B2 | 1/2009 | Rastogi et al. | |
| 7,500,030 B2 | 3/2009 | Hathorn et al. | |
| 7,539,777 B1 | 5/2009 | Aitken | |
| 7,543,087 B2 | 6/2009 | Philbrick et al. | |
| 7,555,554 B2 | 6/2009 | Manders et al. | |
| 7,558,827 B2 | 7/2009 | Kawashima et al. | |
| 7,564,791 B2 | 7/2009 | Jayakrishnan et al. | |
| 7,577,772 B2 | 8/2009 | Sonksen et al. | |
| 7,577,773 B1 | 8/2009 | Gandhi et al. | |
| 7,594,057 B1 | 9/2009 | Gandhi et al. | |
| 7,599,360 B2 | 10/2009 | Edsall et al. | |
| 7,711,871 B1 | 5/2010 | Haechten et al. | |
| 7,743,197 B2 | 6/2010 | Chavan et al. | |
| 7,765,336 B2 | 7/2010 | Butler et al. | |
| 7,826,349 B2 | 11/2010 | Kaur et al. | |
| 7,840,717 B2 | 11/2010 | Flanagan et al. | |
| 7,840,718 B2 | 11/2010 | Ricci et al. | |
| 7,840,719 B2 | 11/2010 | Casper et al. | |
| 7,856,511 B2 | 12/2010 | Ricci et al. | |
| 7,941,570 B2 | 5/2011 | Flanagan et al. | |
| 2001/0030943 A1 | 10/2001 | Gregg et al. | |
| 2002/0062407 A1 | 5/2002 | Tateyama et al. | |
| 2002/0099967 A1 | 7/2002 | Kawaguchi | |
| 2002/0152338 A1 * | 10/2002 | Elliott et al. | 710/34 |
| 2002/0178404 A1 | 11/2002 | Austen et al. | |
| 2003/0056000 A1 | 3/2003 | Mullendore et al. | |
| 2003/0084213 A1 | 5/2003 | Brice, Jr. et al. | |
| 2003/0158998 A1 | 8/2003 | Smith | |
| 2003/0188053 A1 | 10/2003 | Tsai | |
| 2003/0208581 A1 | 11/2003 | Behren et al. | |
| 2004/0030822 A1 | 2/2004 | Rajan et al. | |
| 2004/0054776 A1 | 3/2004 | Klotz et al. | |
| 2004/0113772 A1 | 6/2004 | Hong Chou | |
| 2004/0136241 A1 | 7/2004 | Rapp et al. | |
| 2004/0151160 A1 | 8/2004 | Sanders et al. | |
| 2004/0193968 A1 * | 9/2004 | Dugan et al. | 714/57 |
| 2004/0210719 A1 | 10/2004 | Bushey et al. | |
| 2004/0260851 A1 | 12/2004 | Tu | |
| 2005/0018673 A1 | 1/2005 | Dropps et al. | |
| 2005/0102456 A1 | 5/2005 | Kang | |
| 2005/0105456 A1 | 5/2005 | Cookson et al. | |
| 2005/0108251 A1 | 5/2005 | Hunt | |
| 2005/0175341 A1 | 8/2005 | Ovadia | |
| 2005/0193029 A1 | 9/2005 | Rom et al. | |
| 2005/0204069 A1 | 9/2005 | Carlson et al. | |
| 2005/0223291 A1 | 10/2005 | Zimmer et al. | |
| 2005/0257118 A1 | 11/2005 | Shien | |
| 2006/0036769 A1 | 2/2006 | Frey et al. | |
| 2006/0050726 A1 | 3/2006 | Ahmed et al. | |
| 2006/0085595 A1 | 4/2006 | Slater | |
| 2006/0159112 A1 | 7/2006 | Sundaram et al. | |
| 2006/0224795 A1 | 10/2006 | Muto et al. | |
| 2007/0005838 A1 | 1/2007 | Chang et al. | |
| 2007/0016554 A1 | 1/2007 | Dapp et al. | |
| 2007/0061463 A1 | 3/2007 | Hiramatsu et al. | |
| 2007/0072543 A1 | 3/2007 | Paila et al. | |
| 2007/0079051 A1 | 4/2007 | Tanaka et al. | |
| 2007/0091497 A1 | 4/2007 | Mizuno et al. | |
| 2007/0162631 A1 | 7/2007 | Balakrishnan et al. | |
| 2007/0174544 A1 | 7/2007 | Yasuda et al. | |
| 2007/0239944 A1 | 10/2007 | Rupanagunta et al. | |
| 2007/0294697 A1 | 12/2007 | Theimer et al. | |
| 2008/0040519 A1 | 2/2008 | Starr et al. | |
| 2008/0059638 A1 | 3/2008 | Hathorn et al. | |
| 2008/0147889 A1 | 6/2008 | Casper et al. | |
| 2008/0147890 A1 | 6/2008 | Casper et al. | |
| 2008/0183877 A1 | 7/2008 | Carlson et al. | |
| 2008/0235553 A1 | 9/2008 | Chintada | |
| 2008/0256264 A1 | 10/2008 | Muto et al. | |
| 2008/0273518 A1 | 11/2008 | Pratt | |
| 2008/0307122 A1 | 12/2008 | Butler et al. | |
| 2009/0055585 A1 | 2/2009 | Fernandes et al. | |
| 2009/0144586 A1 | 6/2009 | Casper et al. | |
| 2009/0172203 A1 | 7/2009 | Casper et al. | |
| 2009/0210557 A1 | 8/2009 | Gainey, Jr. et al. | |
| 2009/0210559 A1 | 8/2009 | Flanagan et al. | |
| 2009/0210560 A1 | 8/2009 | Yudenfriend et al. | |
| 2009/0210561 A1 | 8/2009 | Ricci et al. | |
| 2009/0210562 A1 | 8/2009 | Huang et al. | |
| 2009/0210563 A1 | 8/2009 | Flanagan et al. | |
| 2009/0210564 A1 | 8/2009 | Ricci et al. | |
| 2009/0210570 A1 | 8/2009 | Bendyk et al. | |
| 2009/0210571 A1 | 8/2009 | Casper et al. | |
| 2009/0210572 A1 | 8/2009 | Yudenfriend et al. |

| | | | |
|---|---|---|---|
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0064072 A1 | 3/2010 | Tang et al. |

FOREIGN PATENT DOCUMENTS

| | | |
|---|---|---|
| GB | 1264096 | 2/1972 |
| GB | 2291990 | 9/1995 |
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Brice, et al.; U.S. Appl. No. 11/464,613; "Flexibility Controlling The Transfer Of Data Between Input/Output Devices And Memory"; Filed Aug. 15, 2006; Specification having 23 pages and Drawings having 4 sheets.
Casper, et al.; U.S. Appl. No. 11/548,060; "Facilitating Input/Output Processing By Using Transport Control Words To Reduce Input/Output Communications"; Filed Oct. 16, 2006; Specification having 32 pages and Drawings having 12 sheets.
Casper, et al.; U.S. Appl. No. 11/548,093; "Facilitating Access To Status And Measurement Data Associated With Input/Output Processing"; Filed Oct. 16, 2006; Specification having 33 pages and Drawings having 12 sheets.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing On Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
"IBM® z/Architecture Principles of Operation", Publication No. SA22-7832-05, 6th Edition, Apr. 2007. 1,215 pages separated into 4 electronic attachments.
Peterson, David; "Information Techonology, Fibre Channel Protocol for SCSI, Fourth Version (FCP-3)", Draft Proposed American National Standard, Jun. 2004; pp. 1-142.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Snively, et al.; "Fibre Channel, Framing and Signaling"; (FC-FS) Rev. 1.70; NCITS Working Draft Proposed American National Standard for Information Technology; Feb. 2002; pp. i-575.
"Information Technology-Fibre Channel Protocol for SCSI, Third Version (FCP-3)," T10 Project 1560-D, Revision 4g, Sep. 13, 2005.
U.S. Appl. No. 12/031,038 Non-Final Office Action dated Nov. 16, 2009.
U.S. Appl. No. 12/030,975 Non-Final Office Action dated Oct. 22, 2009.
U.S. Appl. No. 12/031,023 Non-Final Office Action dated Oct. 29, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,989 Non-Final Office Action dated Oct. 22, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
Iren, et al.; "The Transport Layer: Tutorial and Survey"; ACM Computing Surveys; vol. 31, No. 4; Dec. 1999; pp. 360-405.
International Search Report and Written Opinion for PCT/EP2009/051447 dated Jul. 1, 2009.
International Search Report and Written Opinion for PCT/EP2009/051483 dated Jul. 27, 2009.
Nordstrom.; "Sequence Reception Method for a Fibre Channel Protocol Chip"; IBM Technical Disclosure Bulletin; vol. 38, No. 12; Dec. 1995; pp. 267-269.
U.S. Appl. No. 11/548,060 Non-Final Office Action dated Apr. 15, 2008.
U.S. Appl. No. 11/548,093 Non-Final Office Action dated Apr. 17, 2008.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Simmons et al.; "A Performance Comparison Of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
U.S. Appl. No. 12/183,315, filed on Jul. 31, 2008.
U.S. Appl. No. 12/183,323, filed on Jul. 31, 2008.
U.S. Appl. No. 12/183,305, filed on Jul. 31, 2008.
"z/Architecture-Principles of Operation," IBM Publication No. SA22-7832-04, 5th Ed., Sep. 2005.
U.S. Appl. No. 12/030,912 Non-Final Office Action dated Mar. 18, 2010.
U.S. Appl. No. 12/030,920 Non-Final Office Action dated Feb. 23, 2010.
U.S. Appl. No. 12/030,954 Non-Final Office Action dated Jan. 21, 2010.
Written Opinion and International Search Report for PCT/EP2009/051461 dated Sep. 22, 2009.
U.S. Appl. No. 12/031,182 Non-Final Office Action dated Jan. 22, 2010.
U.S. Appl. No. 12/031,201 Non-Final Office Action dated Jan. 25, 2010.
International Search Report; International Application No. PCT/EP2009/059184; International Filing Date: Jul. 16, 2009; Date of mailing: Jan. 14, 2010; 9 pages.
U.S. Appl. No. 12/030,967 Restriction Requirement Mailed Dec. 29, 2009.
ANSI INCITS 433-2007, Information Technology Fibre Channel Link Services (FC-LS), Jul. 2007.
Fibre Channel Single Byte Command Code Sets-3 Mapping Protocol (FC-SB-3), T11/Project 1357-D/Rev 1.6, INCITS Mar. 2003.
U.S. Appl. No. 12/030,951 Non-Final Office Action dated May 20, 2010.

U.S. Appl. No. 12/031,038, Non-Final Office Action Mailed Apr. 15, 2010.
U.S. Appl. No. 12/030,975. Final Office Action Mailed May 13, 2010.
U.S. Appl. No. 12/030,967, Notice of Allowance mailed Apr. 23, 2010.
U.S. Appl. No. 12/030,985, Non Final Office Action Mailed May 5, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/183,305, Non-Final Office Action Mailed May 11, 2010.
U.S. Appl. No. 12/183,315 Notice of Allowance dated Jun. 15, 2010.
U.S. Appl. No. 12/030,989 Final Office Action dated May 24, 2010.
SCSI Primary Commands—4 (SPC-4); Project T10/1731-D. Rev 11. INCITS Apr. 14, 2010.
Behrs, JR, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.
Final Office Action for POU920070216US1 U.S. Appl. No. 12/030,912 mailed Oct. 6, 2010.
POU920070217US1_U.S. Appl. No. 12/031,182 Final Office Action Mailed Jul. 22, 2010.
U.S. Appl. No. 12/030,920 Notice of Allowance Mailed Aug. 23, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,042, Final Office Action Mailed Oct. 25, 2010.
U.S. Appl. No. 12/031,021, Notice of Allowance Mailed Jul. 8, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Moore et al., Reconfiguration of Storage Elements to Improve Performance, IBM, Dec. 1983, pp. 1-3. http://priorartdatabas.com/IPCOM/000047719.
U.S. Appl. No. 12/183,315, Notice of Allowance Mailed on Jun. 15, 2010.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/031,023, Final Office Action Mailed Nov. 18, 2010.
U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
U.S. Appl. No. 12/183,323, Non-Final Office Action Mailed Jan. 3, 2011.
Ishikawa, Hikaru, et al. "Bi-Directional OFDM Transmission using Adaptive Modulation that spreads Data Symbols". Power Line Communications and its Applications, 2006, IEEE International Symposium on, Vol., No., pp. 202-207.
Tachikawa, T., et al. "ARQ protocols for bi-directional data transmission," Information Networking, 1998 (ICOIN-12) Proceedings., Twelfth International Conference on., Vol., No., pp. 468-473, Jan. 21-23, 1998.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Goggle/Intel Corporation; 2008-2009.
Hewlett-Packard Company; "HP A4800A PCI FWD SCSI Host Bus Adapter—Service & User Guide", Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 13/075,993 Non Final Office Action Mailed Aug. 31, 2011.
US Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,951, Notice of Allowance Mailed Apr. 4, 2011.
U.S. Appl. No. 12/031,201 Final Office Action dated Jun. 13, 2011.
U.S. Appl. No. 12/030,989, Notice of Allowance Mailed Aug. 5, 2011.
U.S. Appl. No. 12/031,042, Non-Final Office Action Mailed Sep. 30, 2011.
U.S. Appl. No. 12/364615, Notice of Allowance Mailed Mar. 10, 2011.
U.S. Appl. No. 12/946,514, Non-Final Office Action Mailed Jun. 23, 2011.
U.S. Appl. No. 12/183,323, Notice of Allowance Mailed Jun. 23, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.

Miller, DJ.-et al.; "Motivating Future Interconnects: A Differential Measurement Analysis of PCI Latency", ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, Mk.-et al.; "DIF/DIX Aware Linux SCSI HBA Interface"; Google; Oracle Linux Engineering; Jul. 2008.

Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.

* cited by examiner

EARLY TERMINATION OF AN I/O OPERATION IN AN I/O PROCESSING SYSTEM

BACKGROUND OF THE INVENTION

1. Field of Invention

The present disclosure relates generally to input/output (I/O) processing, and in particular, to handling early termination of an I/O operation at a channel subsystem in an I/O processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command formatting and sequencing, as well as roles of the channel subsystem and the control units, can cause difficulties in handling early termination conditions of I/O operations in the I/O processing system. When a storage exception condition is encountered, or a command to clear or halt an I/O operation is received while performing the I/O operation, it would be beneficial to report any issues, and recover from the terminated I/O operation to a known state. Accordingly, there is a need in the art for handling early termination of an I/O operation at a channel subsystem in an I/O processing system.

BRIEF SUMMARY OF THE INVENTION

Embodiments of the invention include a computer program product for handling early termination of an I/O operation at a channel subsystem in an I/O processing system. The computer program product includes a tangible storage medium readable by a processing circuit and storing instructions for execution by the processing circuit for performing a method. The method includes receiving a request to terminate an I/O operation, and transmitting an abort command to a control unit in communication with the channel subsystem in response to receiving the request to terminate the I/O operation. The method also includes transmitting a purge path command to purge a path associated with the I/O operation, where the purge path command includes an error code identifying the request to terminate the I/O operation.

Additional embodiments include an apparatus for handling early termination of an I/O operation. The apparatus includes a channel subsystem for communication with a control unit. The channel subsystem includes one or more channels for directing information flow between memory and one or more I/O devices via the control unit. The channel subsystem performs a method that includes receiving a request to terminate an I/O operation, and transmitting an abort command to the control unit in response to receiving the request to terminate the I/O operation. The method performed by the channel subsystem also includes transmitting a purge path command to purge a path associated with the I/O operation, where the purge path command includes an error code identifying the request to terminate the I/O operation.

Further embodiments include a method for handling early termination of an I/O operation at a channel subsystem in an I/O processing system. The method includes receiving a request to terminate an I/O operation, and transmitting an abort command to a control unit in communication with the channel subsystem in response to receiving the request to terminate the I/O operation. The method further includes transmitting a purge path command to purge a path associated with the I/O operation, where the purge path command includes an error code identifying the request to terminate the I/O operation.

Other computer program products, apparatuses, and/or methods according to embodiments will be or become apparent to one with skill in the art upon review of the following drawings and detailed description. It is intended that all such additional computer program products, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
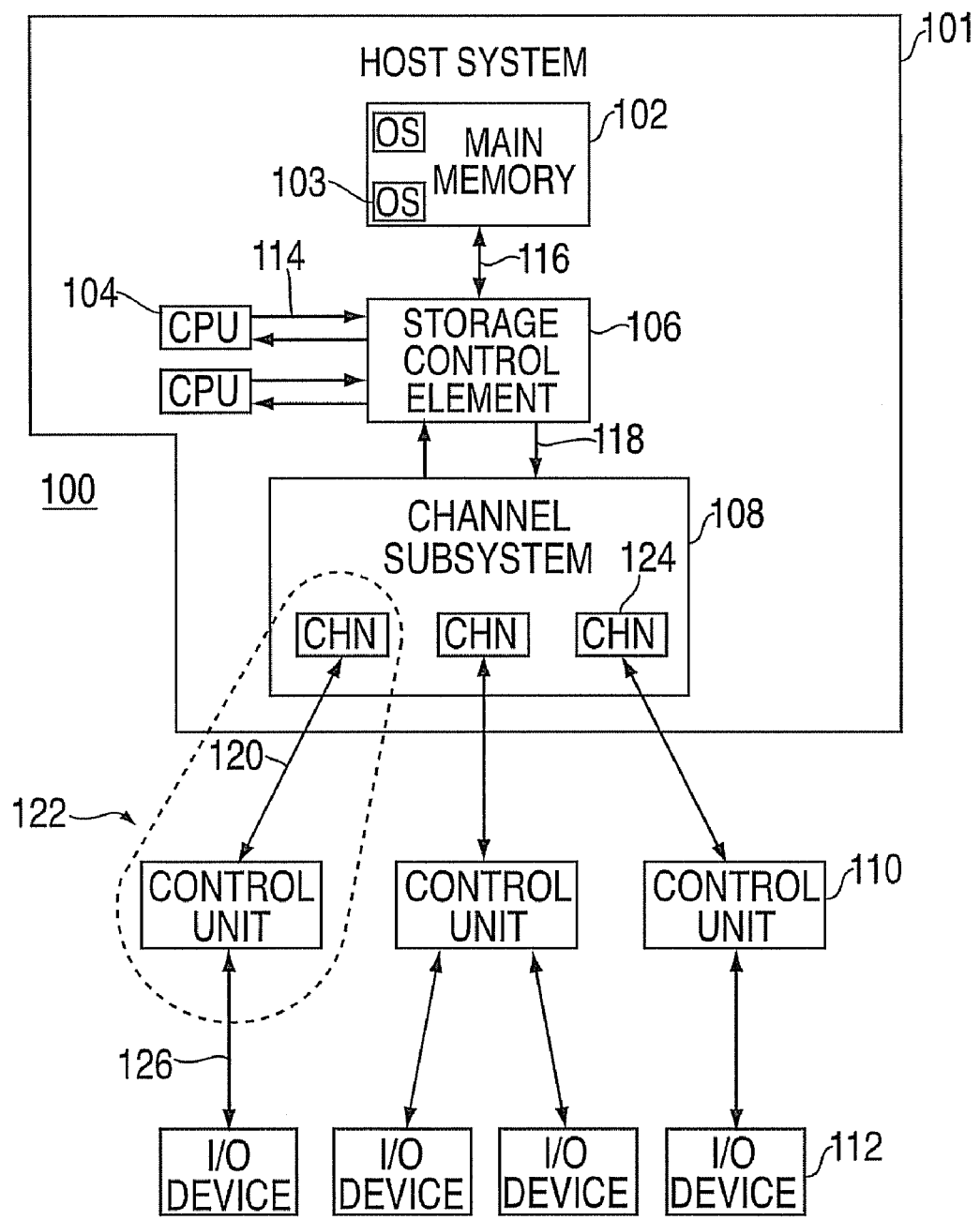
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to information, such as status, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

The OS processes response messages from the control unit and can detect an error condition associated with an I/O device via a subchannel. In response to detecting the error condition, the OS may initiate a request to clear the subchannel or halt the subchannel. The I/O communications adapter interprets the request and initiates a command sequence to halt and/or reset the I/O device via one or more messages sent to the control unit. A storage exception, such as requesting an invalid address, may also initiate a command sequence to purge a path between the I/O communications adapter and the control unit. The sequence of messages can vary depending on whether an exchange is currently open between the I/O communications adapter and the control unit.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

CPU programs initiate I/O operations with the instruction START SUBCHANNEL. This instruction passes the contents of an operation-request block (ORB) to the subchannel. The contents of the ORB include the subchannel key, the address of the first CCW to be executed, and a specification of the format of the CCWs. The CCW specifies the command to be executed and the storage area, if any, to be used. When START SUBCHANNEL is executed, parameters are passed to the target subchannel requesting that the channel subsystem perform a start function with the I/O device associated with the subchannel. The channel subsystem performs the start function by using information at the subchannel, including the information passed during the execution of the START SUBCHANNEL instruction, to find an accessible channel path to the device. (Pops page 13-6)

The execution of HALT SUBCHANNEL causes the channel subsystem to issue the halt signal to the I/O device and terminate channel-program execution at the subchannel. When channel-program execution is terminated by the execution of HALT SUBCHANNEL, the program is notified of the termination by means of an I/O-interruption request. (Pops p. 13-9)

The halt signal is provided so the channel subsystem can terminate an I/O operation. The halt signal is issued by the channel subsystem as part of the halt function performed subsequent to the execution of HALT SUBCHANNEL. The halt signal is also issued by the channel subsystem when certain error conditions are encountered. For the FICON-I/O-interface type of channel path, the halt signal results in the channel subsystem using the cancel function defined in the ANSI standards document *Fibre Channel-Single-Byte Command Code Sets*-2 (*FC-SB*-2). (Pops page 17-11)

The cancel function shall cause the designated device to terminate execution of the current operation, if any. When the channel has initiative to send a cancel IU during data transfer for a write operation, it shall stop data transfer for the write operation. The last IU sent for the data transfer shall contain either a command-data DIB or data DIB with the E or EE bit set to one and contain a CRC (Cyclic Redundancy Check) field. (FC-SB p. 134

When an I/O operation is terminated by the cancel function, the device shall proceed to its normal ending point (including mechanical motion) and, as a result of having gone to its normal ending point, the device shall generate channel-end and device-end status, as appropriate, for the I/O operation. If an I/O operation is neither being initiated nor in progress, the cancel function shall cause no action at the device. (FC-SB p. 135)

The execution of CLEAR SUBCHANNEL clears the subchannel of indications of the channel program in execution, causes the channel subsystem to issue the clear signal to the I/O device, and causes the channel subsystem to generate an I/O-interruption request to notify the program of the completion of the clear function. (Pops p. 13-9)

The clear signal is provided so the channel subsystem can terminate an I/O operation and reset status and control information contained at the device. The clear signal is issued as part of the clear function performed subsequent to the execution of CLEAR SUBCHANNEL. The clear signal is also issued by the channel subsystem when certain error conditions or equipment malfunctions are detected by the I/O device or the channel subsystem. For the FICON-I/O-interface type of channel path, the clear signal results in the channel subsystem using the selective-reset function defined in the ANSI standards document *Fibre Channel-Single-Byte Command Code Sets*-2 (*FC-SB*-2). (Pops p. 17-11)

If an I/O operation is in progress at the device and the device is actively communicating over a channel path in the performance of that I/O operation when a clear signal is received on that channel path, the device disconnects from that channel path upon receiving the clear signal. Data transfer and any operation using the facilities of the control unit are immediately concluded, and the I/O device is not necessarily positioned at the beginning of a block. Mechanical motion not involving the use of the control unit, such as rewinding magnetic tape or positioning a disk-access mechanism, proceeds to the normal stopping point, if possible. The device may appear busy until termination of the mechanical motion or the inherent cycle of operation, if any, whereupon it becomes available. Status information in the device and control unit is reset, but an interruption condition may be generated upon the completion of any mechanical operation. (Pops page 17-11, 17-12)

The selective-reset function shall cause a device and its status to be reset with respect to the particular logical path. Only the device and certain allegiances associated with the designated logical path shall be reset. The definition of the reset state of the device is model dependent. When a device performs the selective-reset operation, the device and its status shall be reset. Any I/O operation in progress for the device on that logical path shall proceed to a normal ending point, if applicable, with no further data transfer. All unexecuted command IUs and their associated data shall be discarded. If an IU is in the process of being sent, the control unit shall finish sending that IU. No further IUs shall be sent pertaining to the I/O operation that was reset. (FC-SB p. 138)

Figure 2A:
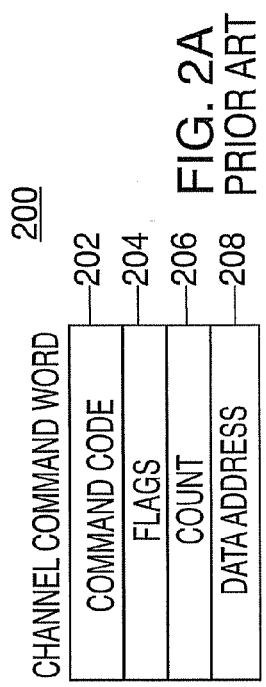
FIG. 2a depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2a. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2b. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2b. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2b) and the data is obtained from define extent data area 216. The channel 300 uses TIC 218 to locate the locate record CCW and the read CCW. It fetches the locate record command 305 (FIG. 3) from the locate record CCW 217 (FIG. 2b) and obtains the data from locate record data 220. The read command 306 (FIG. 3) is fetched from read CCW 221 (FIG. 2b). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4 k of data, as in FIG. 2b, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transfer mode indirect data address words (TIDAWs), similar to MIDAWs) that points to data area 406, and a status area 408. TCWs, TCCBs, and status are described in further detail below. CCW channel programs and TCW channel programs are executed in separate modes of operation, referred to as command mode and transport mode respectively. In an exemplary embodiment, the I/O processing system 100 of FIG. 1 supports both command mode and transport mode.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—

Fibre Channel Protocol for SCSI, Third Version (FCP-3)," T10 Project 1560-D, Revision 4, Sep. 13, 2005, which is hereby incorporated herein by reference in its entirety.

The FCP defines the following terms, as recited in "Information Technology—Fibre Channel Protocol for SCSI, Third Version (FCP-3)", pages 3-5:
N_Port: A hardware entity that supports the FC-FS-2 FC-2 layer. It may act as an Originator, a Responder, or both;
Originator: The logical function associated with an N_Port responsible for originating an Exchange;
Responder: The logical function in an N_Port responsible for supporting the Exchange initiated by the Originator in another N_Port;
Exchange: The basic mechanism that transfers information consisting of one or more related nonconcurrent Sequences that may flow in the same or opposite directions. The Exchange is identified by an Originator Exchange_ID (OX_ID) and a Responder Exchange_Identifier (RX_ID);
Sequence: A set of one or more Data frames with a common Sequence_ID (SEQ_ID), transmitted unidirectionally from one N_Port to another N_Port with a corresponding response, if applicable, transmitted in response to each Data frame; and
FCP_Port: An N_Port or NL_Port that supports the SCSI Fibre Channel Protocol.

Fibre Channel (FC) is logically a point-to-point serial data channel. The Fibre Channel Physical layer (FC-2 layer) described by FC-FS-2 performs those functions required to transfer data from one N_Port or NL_Port to another. An FC-4 mapping layer uses the services provided by FC-FS-2 to perform the functions defined by the FC-4. The protocol is described in terms of the stream of FC IUs and Exchanges generated by a pair of FCP_Ports that support the FC-4. The I/O operation defined by SAM-3 is mapped into a Fibre Channel Exchange. A Fibre Channel Exchange carrying information for a SCSI I/O operation is an FCP Exchange. The request and response primitives of an I/O operation are mapped into Information Units (IUs) as shown in table 1.

TABLE 1

SCSI and Fibre Channel Protocol functions

| SCSI function | FCP Equivalent |
|---|---|
| I/O operation | Exchange |
| Protocol Service request and response | Sequence |
| Send SCSI Command request | Unsolicited command IU (FCP_CMND) |
| Data delivery request | Data descriptor IU (FCP_XFER_RDY) |
| Data delivery action | Solicited data IU (FCP_DATA) |
| Send Command Complete response | Command status IU (FCP_RSP) |
| REQ/ACK for Command Complete | Confirmation IU (FCP_CONF) |

An application client begins an FCP I/O operation when it invokes a Send SCSI Command SCSI transport protocol service request or a Send Task Management Request SCSI transport protocol service request (see SAM-3). The Send SCSI Command SCSI transport protocol service request conveys a single request or a list of linked requests from the application client to the FCP service delivery subsystem. Each request contains all the information necessary for the processing of one SCSI command or task management function, including the local storage address and characteristics of data. The Fibre Channel Protocol then performs the following actions using FC-FS-2 services to perform the SCSI command or task management function. (FCP-3, p. 10)

The FCP_Port that is the initiator for the command starts an Exchange by sending an unsolicited command IU containing the FCP_CMND IU payload, including some command controls, addressing information, and the SCSI command descriptor block (CDB). The initiator FCP_Port sends the FCP_CMND IU payload to invoke the Send SCSI Command SCSI transport protocol service request (see SAM-3) and start the FCP I/O operation. The Exchange that is started is identified by its fully qualified exchange identifier (FQXID) during the remainder of the FCP I/O operation and is used only for the IUs associated with that FCP I/O operation. (FCP-3, p. 10)

After all the data has been transferred, the device server transmits the Send Command Complete protocol service response (described in SAM-3) by requesting the transmission of an IU containing the FCP_RSP IU payload. That payload contains the SCSI status and, if the SCSI status is CHECK CONDITION, the autosense data describing the condition. The FCP_RSP IU indicates completion of the SCSI command. If no command linking, error recovery, or confirmed completion is requested, the FCP_RSP IU is the final sequence of the Exchange. The device server determines whether additional linked commands are to be performed in the FCP I/O operation. If this is the last or only command processed in the FCP I/O operation, the FCP I/O operation and the Exchange are terminated. (FCP-3, p. 11)

Figure 5:
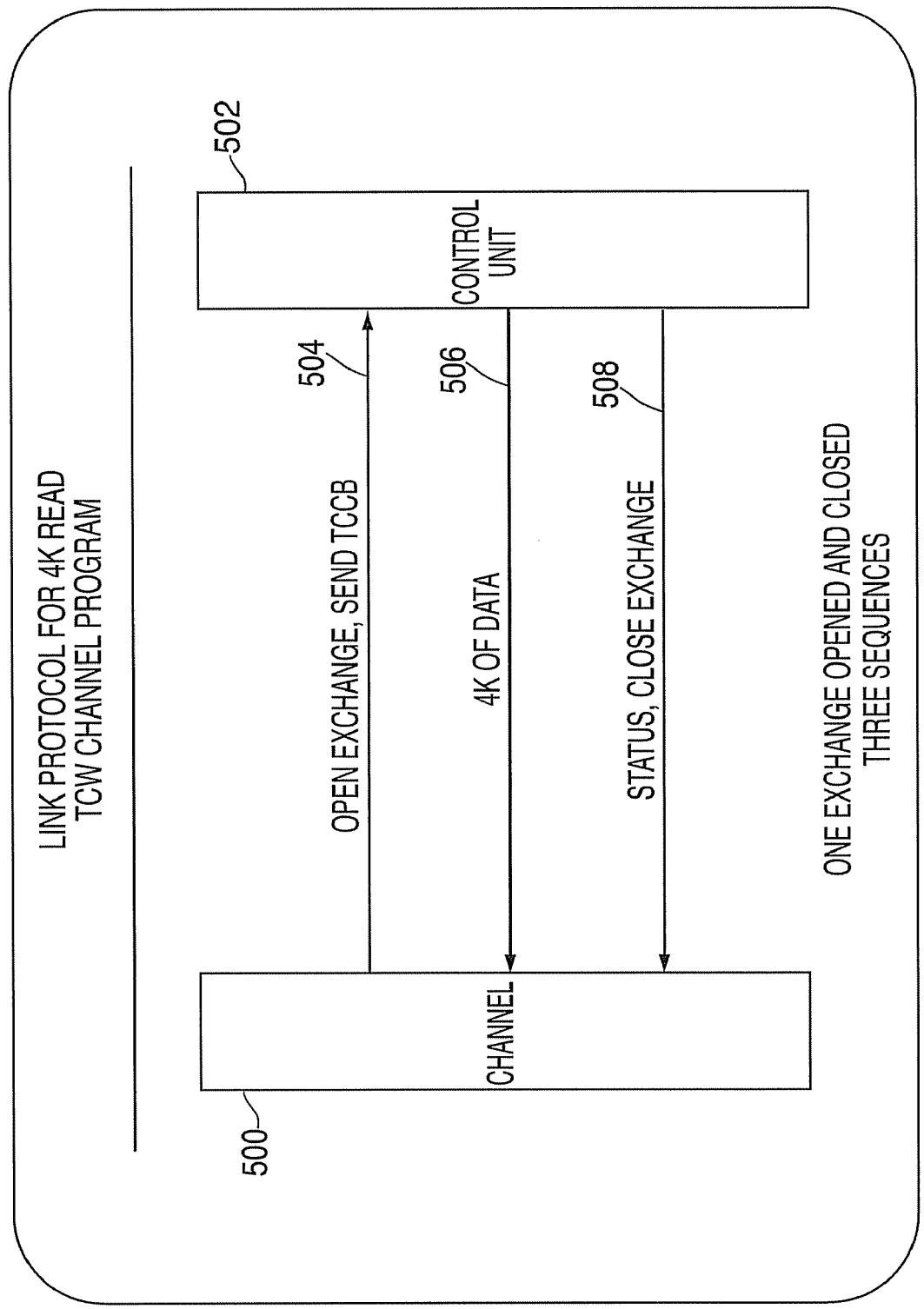
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP RSP IU, also referred to as a transport response IU. The FCP_RSP IU payload may be used to transport FICON ending status along with additional status information, including parameters that support the calculation of extended measurement words and notify the channel 500 of the maximum number of open exchanges supported by the control unit 502.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502. (Fcp Transfer Ready Disabled)
3. Final status is sent in a FCP status frame that has a bit active in, for instance, byte 10 or 11 of the FCP_RSP IU Payload. The FCP_RSP_INFO field or sense field is used to transport FICON ending status along with additional status information, including parameters that support the calculation of extended measurement words and notify the channel 500 of the maximum number of open exchanges supported by the control unit 502.

Figure 2B:
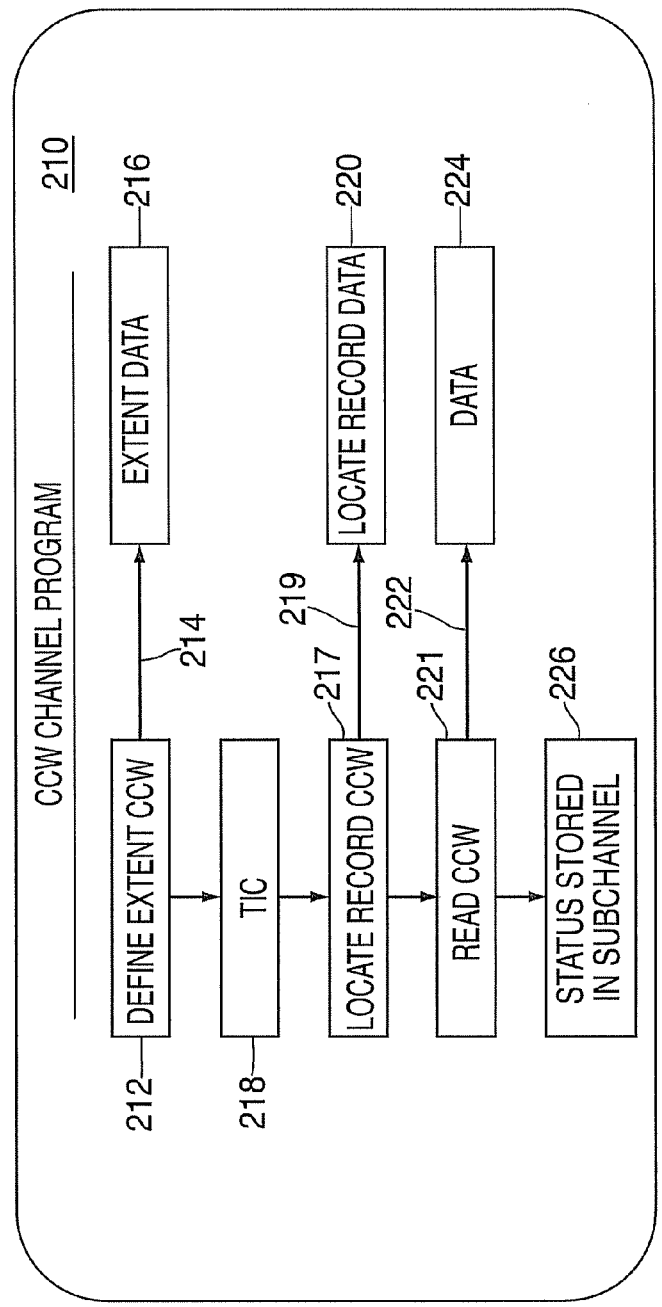
FIG. 2b depicts one example of a prior art channel command word channel program.
Figure 3:
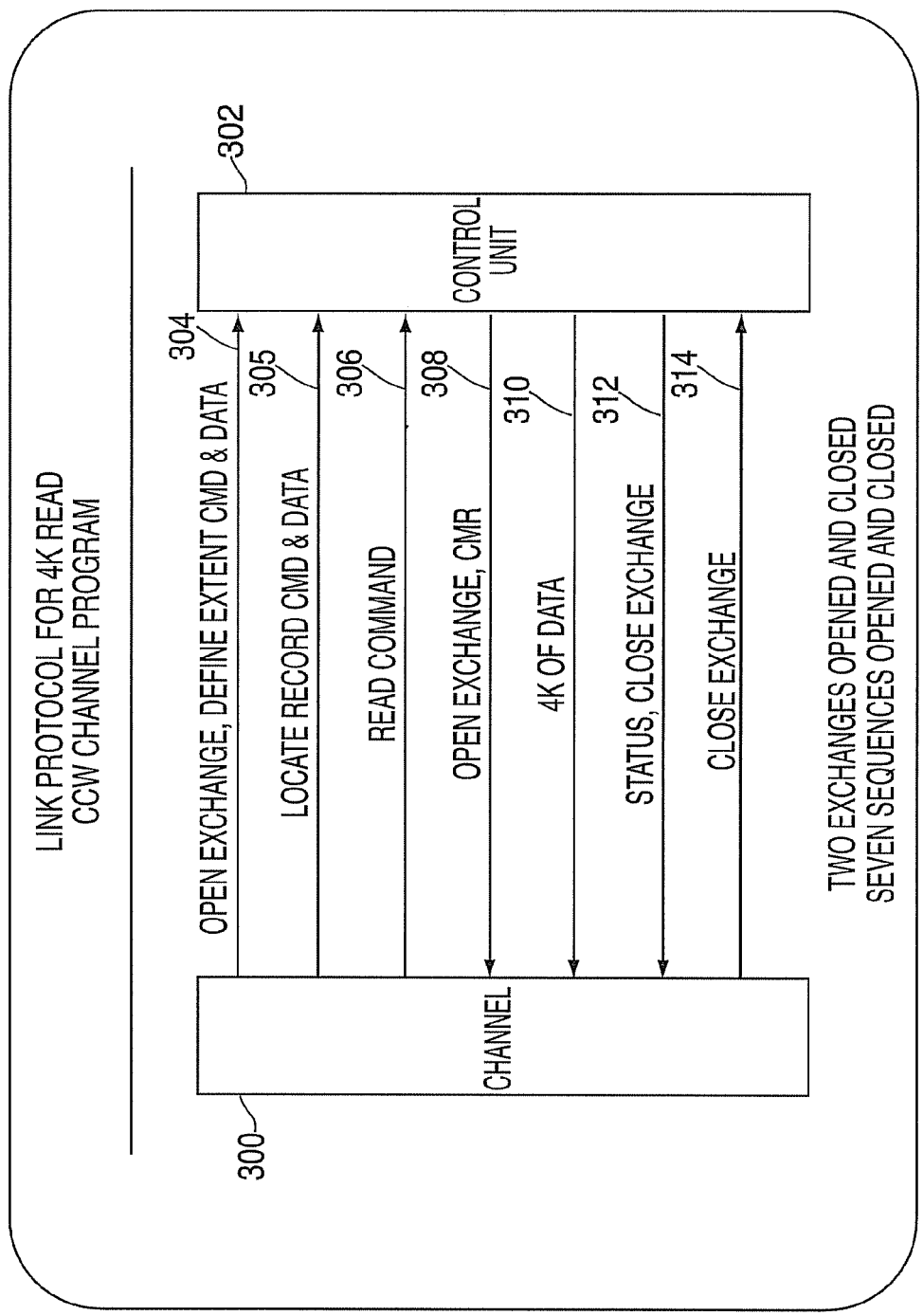
FIG. 3 depicts one embodiment of a prior art link protocol used in communicating between a channel and control unit to execute the channel command word channel program of FIG. 2b.
Figure 4:
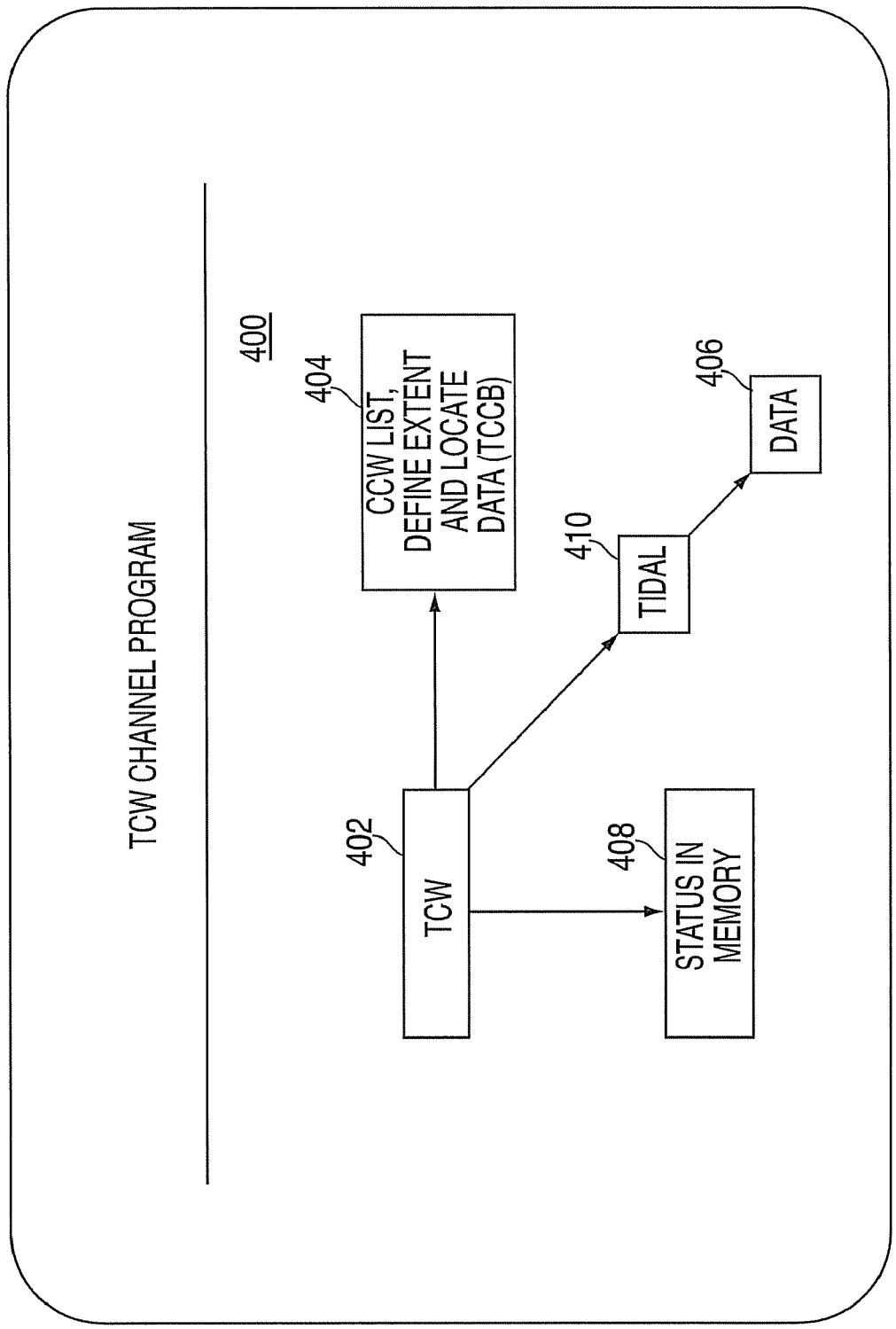
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2b (see also FIG. 3). Further, for the TCW channel program, there are three communication sequences (see FIGS. 4-5), as compared to seven sequences for the CCW channel program (see FIGS. 2b-3).

Figure 6:
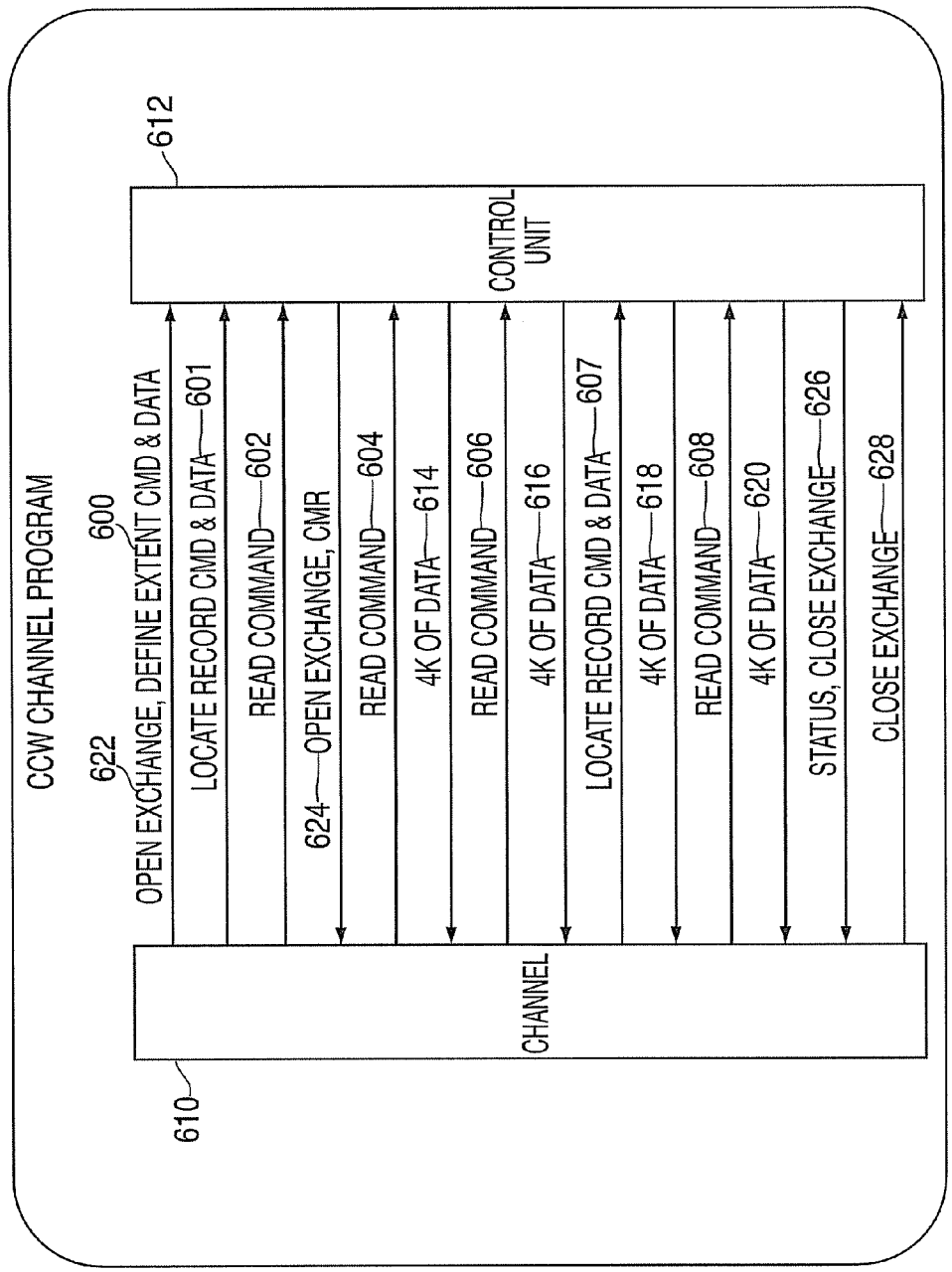
FIG. 6 depicts one embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
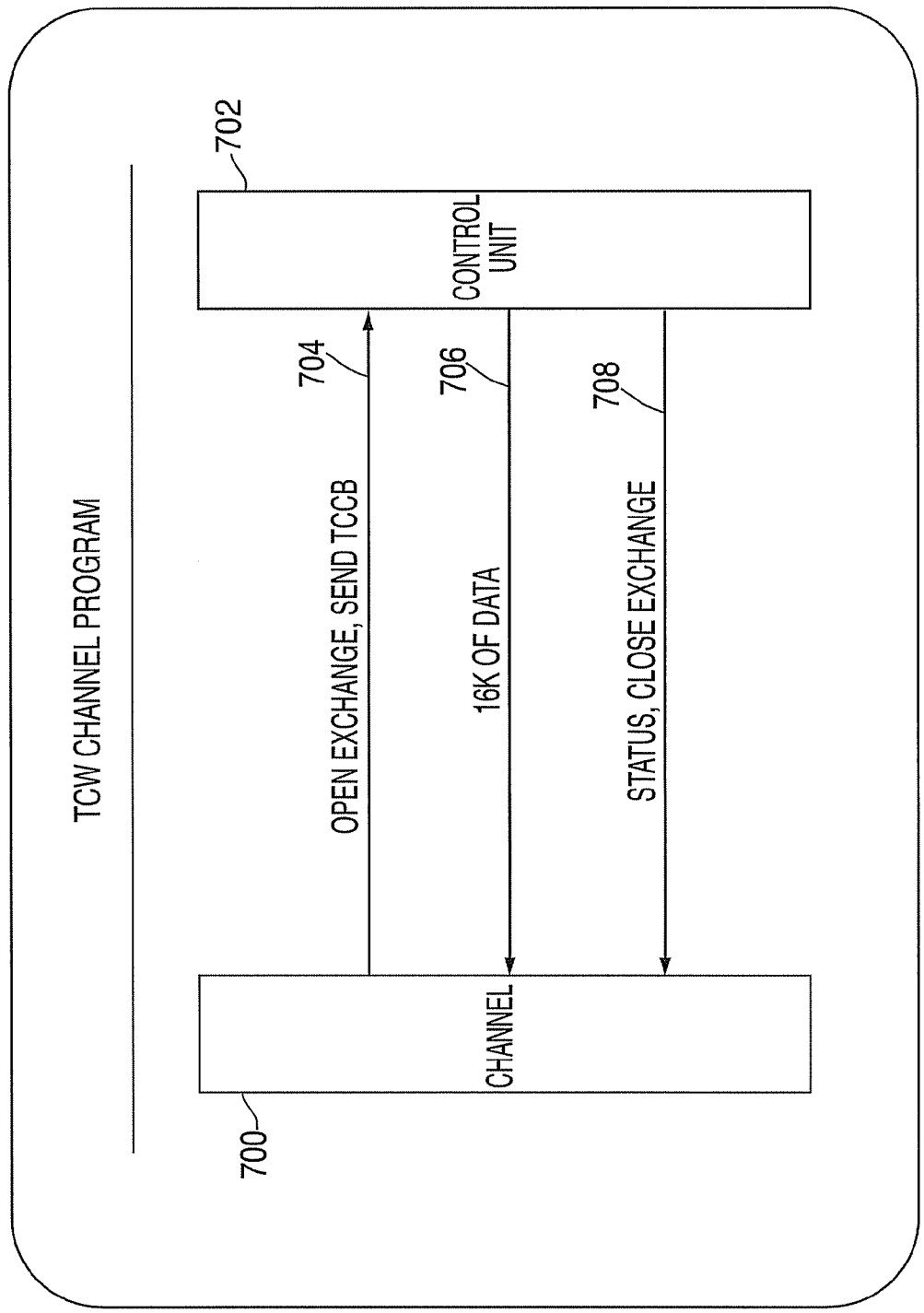
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much less communications to transfer the same amount of data as the CCW channel program of FIG. 6.

Figure 8:
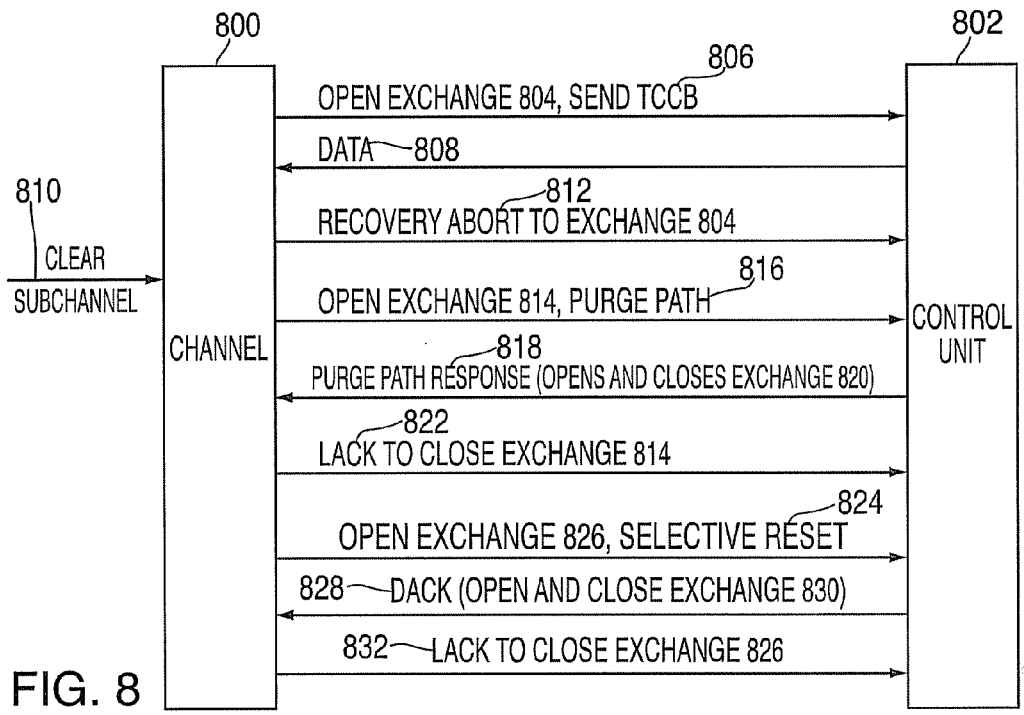
FIG. 8 depicts one embodiment of a link protocol used to communicate between a channel and control unit to clear a subchannel, in accordance with an aspect of the present invention.

Turning now to FIG. 8, an exemplary link protocol used to communicate between channel 800 and control unit 802 is depicted. The channel 800 opens an exchange 804 and sends a TCCB 806 to the control unit 802. The control unit 802 responds by sending data 808 to the channel 800. The channel 800 receives a clear subchannel command 810 to abort exchange 804. The clear subchannel command 810 may be generated by an OS controlling and monitoring communication with the control unit 802 via the channel 800, for example, OS 103 of FIG. 1. In response to receiving the clear subchannel command 810, the channel 800 initiates a recovery abort 812 of the exchange 804. The recovery abort is an FC-FS-2 protocol that recovers FCP Port resources associated with an Exchange that is being terminated, either because of a task management request or because of an error. (FCP-3, p. 67) The channel 800 opens an exchange 814 and sends a purge path IU 816 to the control unit 802. The purge path IU 816 includes an error code informing the control unit 802 that exchange 804 was aborted because of the clear subchannel command 810. The control unit 802 responds with a purge path response IU 818. The purge path response IU 818 may be transmitted on exchange 820, which is opened and closed as part of a combined sequence. The channel 800 sends a link-level acknowledgement (LACK) 822 to the control unit 802 to close exchange 814. While exchanging messages, the channel 800 and the control unit 802 may initially communicate in transport mode for the sequences between the TCCB 806 and recovery abort 812. The channel 800 can then switch to command mode and send the purge path 816 and when the purge path sequence is completed, send a selective reset 824 to the control unit 802. The start of the selective reset 824 sequence can be transmitted on exchange 826. The control unit 802 may respond with a device-level acknowledgement (DACK) 828 on exchange 830. The channel 800 closes exchange 826 via LACK 832. Switching between transport mode and command mode may enable commands to be sent between the channel 800 and the control unit 802 that are only supported in one of the respective modes. In an exemplary embodiment, the subchannel associated with the clear subchannel command 810 is cleared of any state information upon completion of the sequences depicted in FIG. 8.

Figure 9:
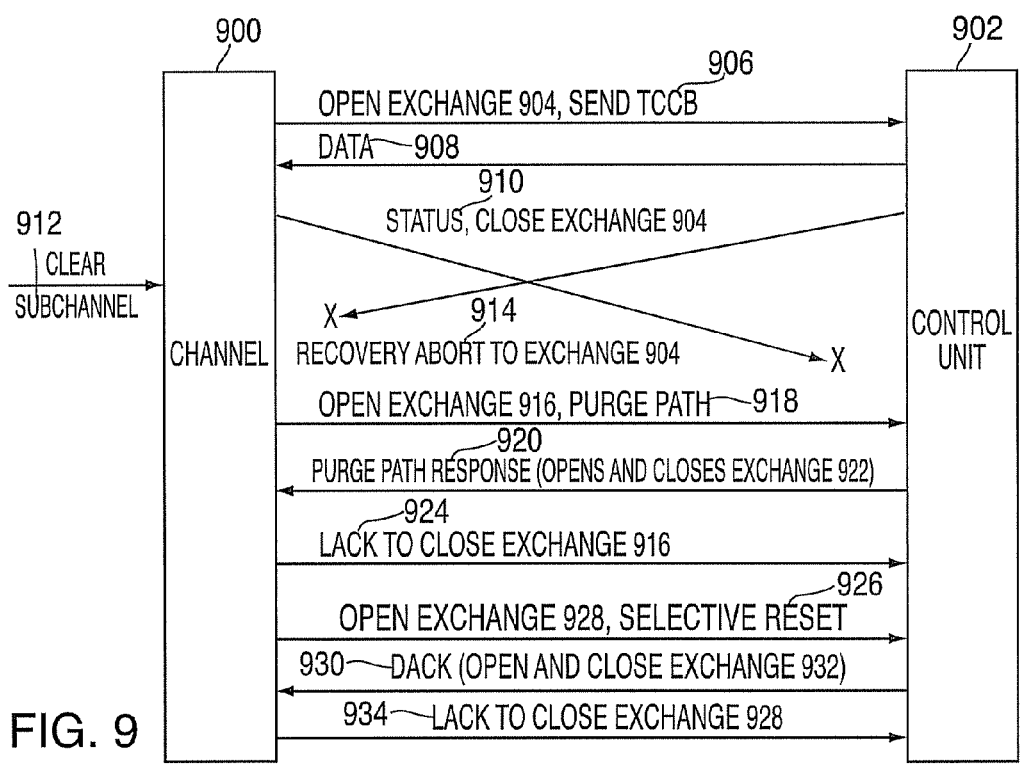
FIG. 9 depicts an additional embodiment of a link protocol used to communicate between a channel and control unit to clear a subchannel, in accordance with an aspect of the present invention.

Turning now to FIG. 9, an additional example of a link protocol used to communicate between channel 900 and control unit 902 is depicted. The channel 900 opens exchange 904 and sends a TCCB 906 to the control unit 902. The control unit 902 responds by sending data 908 to the channel 900. The control unit 902 sends status 910 and closes exchange 904. Prior to the channel 900 receiving the status 910, the channel 900 receives a clear subchannel command 912 to abort exchange 904. The channel 900 initiates a recovery abort 914 of the exchange 904; however, the control unit 902 does not receive the recovery abort 914 since it already closed exchange 904. Similarly, the channel 900 may not receive the status 910, if the recovery abort 914 is sent earlier. The channel 900 proceeds to open an exchange 916 and sends a purge path IU 918 to the control unit 902. The purge path IU 918 includes an error code informing the control unit 902 that exchange 904 was aborted because of the clear subchannel command 912. The control unit 902 responds with a purge path response IU 920. The purge path response IU 920 may be transmitted on exchange 922, which is opened and closed as part of a combined sequence. The channel 900 sends a LACK 924 to the control unit 902 to close exchange 916. While exchanging messages, the channel 900 and the control unit 902 may initially communicate in transport mode for the sequences between the TCCB 906 and recovery abort 914. The channel 900 can then switch to command mode and send the purge path 918 and when the purge path sequence is complete, send a selective reset 926 to the control unit 902. The start of the selective reset 926 sequence can be transmitted on exchange 928. The control unit 902 may respond with a DACK 930 on exchange 932. The channel 900 closes exchange 928 via LACK 934. Thus, even though commands may be lost due to relative timing differences, e.g., status 910 crossing paths with recovery abort 914, the net result is that the selective reset 926 is successfully received at the control unit 902, restoring I/O operations to a known state. In an exemplary embodiment, the subchannel associated with the clear subchannel command 912 is cleared of any state information upon completion of the sequences depicted in FIG. 9.

Figure 10:
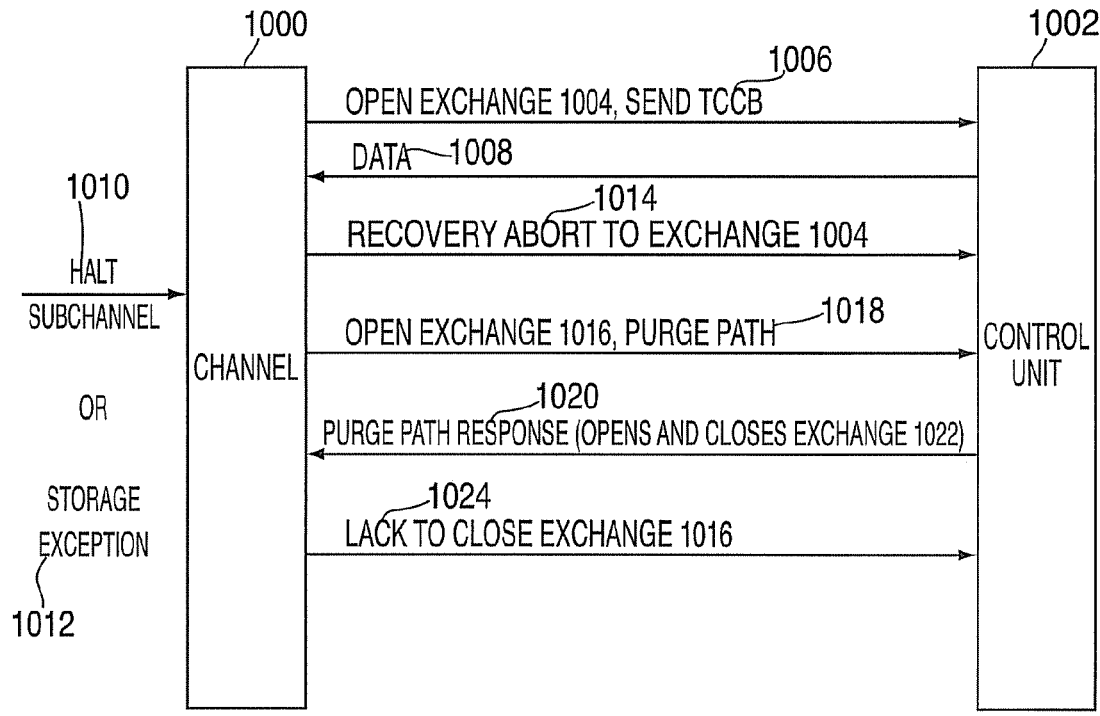
FIG. 10 depicts one embodiment of a link protocol used to communicate between a channel and control unit to halt a subchannel or respond to an exception condition, in accordance with an aspect of the present invention.

Turning now to FIG. 10, an exemplary link protocol used to communicate between channel 1000 and control unit 1002 is depicted. The channel 1000 opens an exchange 1004 and sends a TCCB 1006 to the control unit 1002. The control unit 1002 responds by sending data 1008 to the channel 1000. The channel 1000 may receive either a halt subchannel command 1010 or a storage exception 1012 to abort exchange 1004. The halt subchannel command 1010 may be generated by an OS controlling and monitoring communication with the control unit 1002 via the channel 1000, for example, OS 103 of FIG. 1. The storage exception 1012 may occur when fetching or storing data from or to the host system that includes the channel 1000, e.g., host system 101 of FIG. 1. In response to receiving the halt subchannel command 1010 or storage exception 1012, the channel 1000 initiates a recovery abort 1014 of the exchange 1004. The channel 1000 opens an exchange 1016 and sends a purge path IU 1018 to the control unit 1002. The purge path IU 1018 includes an error code that can inform the control unit 1002 that exchange 1004 was aborted because of the halt subchannel command 1010 or the storage exception 1012. The error code informs the control unit 1002 that the recovery abort 1014 was not the result of a link error, but of some condition in the host system that includes channel 1000, for instance, host system 101 of FIG. 1.

The control unit 1002 responds with a purge path response IU 1020. The purge path response IU 1020 may be transmitted on exchange 1022, which is opened and closed as part of a combined sequence. The channel 1000 sends a LACK 1024 to the control unit 1002 to close exchange 1016. In an exemplary embodiment, after halt subchannel command 1010 or storage exception 1012, information for the associated subchannel that was active for an I/O operation is stored with primary, secondary and alert status. The primary, secondary and alert status may be used for diagnostic purposes to provide state and status information surrounding an early I/O operation termination. For the halt subchannel command 1010 received while the channel 1000 is in transport mode, the channel 1000 need not follow up with a cancel sequence, which may otherwise be performed in command mode.

Figure 11:
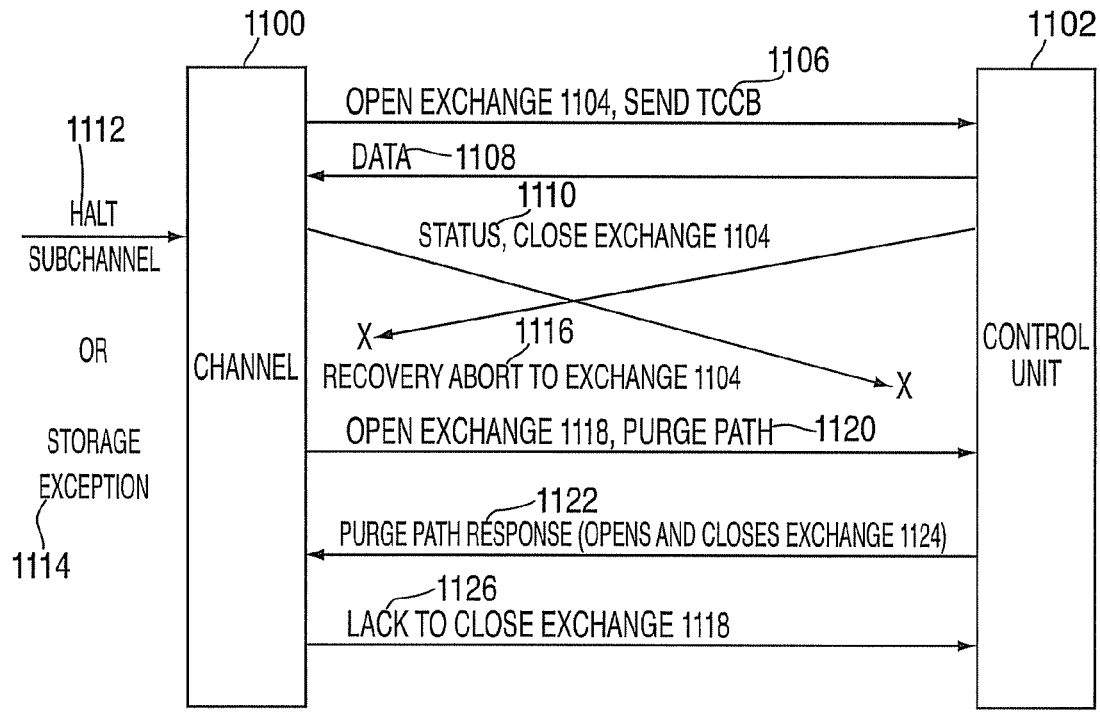
FIG. 11 depicts an additional embodiment of a link protocol used to communicate between a channel and control unit to halt a subchannel or respond to an exception condition, in accordance with an aspect of the present invention.

Turning now to FIG. 11, an additional example of a link protocol used to communicate between channel 1100 and control unit 1102 is depicted. The channel 1100 opens exchange 1104 and sends a TCCB 1106 to the control unit 1102. The control unit 1102 responds by sending data 1108 to the channel 1100. The control unit 1102 sends status 1110 and closes exchange 1104. Prior to the channel 1100 receiving the status 1110, the channel 1100 may receive either a halt subchannel command 1112 or a storage exception 1114 to abort exchange 1104. The channel 1100 initiates a recovery abort 1116 of the exchange 1104; however, the control unit 1102 does not receive the recovery abort 1116 since it already closed exchange 1104. Similarly, the channel 1100 may not receive the status 1110 if the recovery abort 1116 is sent earlier. The channel 1100 proceeds to open an exchange 1118 and sends a purge path IU 1120 to the control unit 1102. The purge path IU 1120 includes an error code informing the control unit 1102 that exchange 1104 was aborted because of the halt subchannel command 1112 or the storage exception 1114. The control unit 1102 responds with a purge path response IU 1122. The purge path response IU 1122 may be transmitted on exchange 1124, which is opened and closed as part of a combined sequence. The channel 1100 sends a LACK 1126 to the control unit 1102 to close exchange 1118. Thus, even though commands may be lost due to relative timing difference, e.g., status 1110 crossing paths with recovery abort 1116, the net result is that I/O operation at the control unit 1102 is restored to a known state. In an exemplary embodiment, after halt subchannel command 1112 or storage exception 1114, information for the associated subchannel that was active for an I/O operation is stored with primary, secondary and alert status. For the halt subchannel command 1112, the channel 1100 operating in transport mode need not open a new exchange to execute a cancel sequence, which may otherwise be performed in command mode. Upon terminating an I/O operation, it may be possible for status such as device end (DE) status to remain set in the control unit 1102 if the control unit 1102 splits ending status of a final DCW of an I/O operation. The DE status can be presented to the channel 1100 as an alert status or alert with busy for a new I/O operation.

In an exemplary embodiment, when a storage address list and byte counts are configured and the control unit 1102 requests data explicitly or implicitly (e.g., with a transfer ready indicator disabled) from these addresses and an exception condition is encountered, the exception condition is reported and the associated exchange is terminated with via recovery abort 1116. It does not matter if a record on an associated I/O device required the data or not. While systems running in command mode may not report such an error unless required to complete execution of a channel program, operating in transport mode allows the error to be reported, which can simplify channel design.

Figure 12:
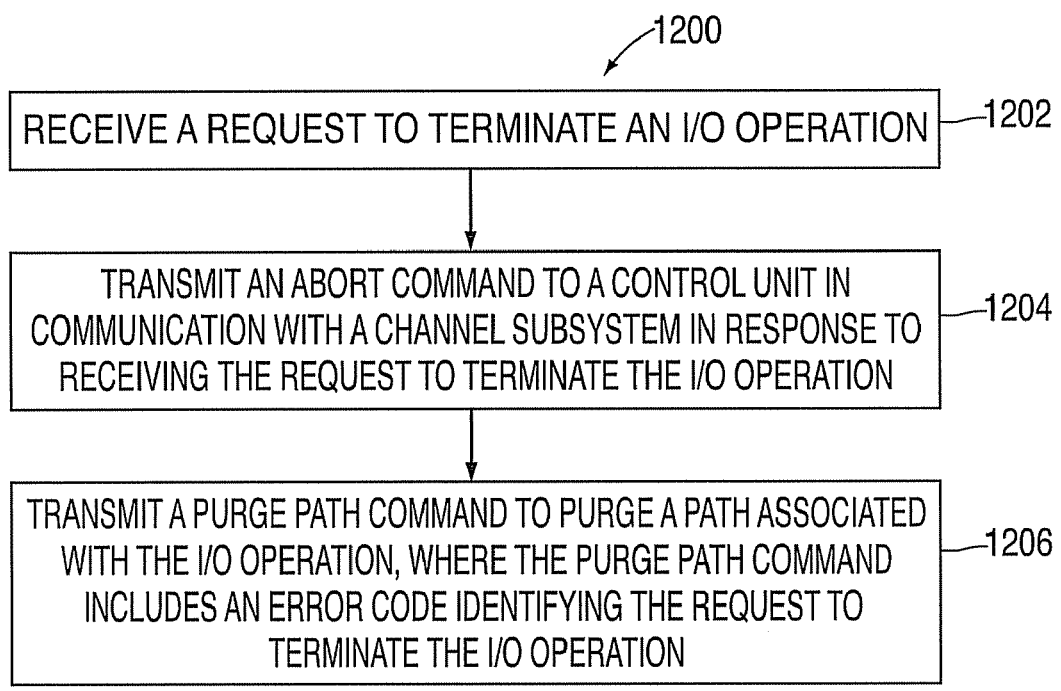
FIG. 12 depicts one embodiment of a process for handling early termination of an I/O operation at a channel subsystem in an I/O processing system.

Turning now to FIG. 12, a process 1200 for handling early termination of an I/O operation at a channel subsystem in an I/O processing system will now be described in accordance with exemplary embodiments, and in reference to the I/O processing system 100 of FIG. 1. OS 103 may send a command message to perform an I/O operation, e.g., reading data from I/O device 112, using channel path 122 between channel 124 of channel subsystem 108 to control unit 110 in communication with I/O device 112. The command message may be a transport command IU, including a TCCB with multiple DCWs as part of a TCW channel program. The control unit 110 can respond with data, as well as status associated with the command message. The I/O operation may be terminated prematurely for a variety of error conditions, for instance, in response to a clear or halt subchannel command or upon a storage exception. In some instances, it may be desirable to halt an I/O operation and in other instances, a reset is preferred. Beyond providing a basic error or link error indicator, channel 124 can include additional error code information as part of the message sequences with the control unit 110.

At block 1202, the channel subsystem 108 receives a request to terminate an I/O operation. Examples of specific channels that may be part of the channel subsystem 108 include channels 800 of FIG. 8, 900 of FIG. 9, 1000 of FIGS. 10, and 1100 of FIG. 11, which depict various link protocol examples that can also be performed by channel 124 of FIG. 1. The request to terminate the I/O operation can be a clear subchannel command, a halt subchannel command, or a storage exception, among others, such as the examples depicted in FIGS. 8-11.

At block 1204, the channel subsystem 108 transmits an abort command to control unit 110 in communication with the channel subsystem 108 in response to receiving the request to terminate the I/O operation. The abort command may be a recovery abort, such as recovery abort 812 of FIG. 8, recovery abort 914 of FIG. 9, recovery abort 1014 of FIG. 10, or recovery abort 1116 of FIG. 11, where control units 802, 902, 1002, and 1102 are exemplary embodiments of control unit 110. If control unit 110 receives the abort command, it may close an open exchange associated with the abort command, for instance, control unit 802 closes exchange 804 of FIG. 8 in response to recovery abort 812. In an alternate exemplary embodiment, control unit 110 closes the open exchange prior to receiving the abort command, e.g., control unit 902 closes exchange 904 upon sending status 910 in FIG. 9.

At block 1206, the channel subsystem 108 transmits a purge path command to purge a path associated with the I/O operation, where the purge path command includes an error code identifying the request to terminate the I/O operation. For example, channel 800 of FIG. 8 transmits purge path IU 816 with the error code indicating that recovery abort 812 was sent because of clear subchannel command 810. Similarly, channel 1000 of FIG. 10 can transmit purge path IU 1018 with the error code indicating that recovery abort 1014 was sent because of either halt subchannel command 1010 or storage exception 1012. The various error codes can assist in distinguishing between an unexpected link error condition or a software initiated request. When a clear subchannel command, e.g., clear subchannel command 912 is sent to a subchannel that is operating in transport mode, a mode switch can be performed to send a reset command, e.g., selective reset 926, in command mode.

Technical effects of exemplary embodiments include handling all early termination of an I/O operation at a channel subsystem in an I/O processing system using the same sequence. In an exemplary embodiment, multiple termination sources including link errors are handled with the recovery abort sequence. Then by extending the error codes in the command mode purge path sequence, the control unit is provided with the additional reasons a sequence may be aborted. Advantages include simplifying the link protocol, by providing a common approach to shut down a sequence in transport mode and then supplying the control unit with the additional error information when sending the purge path IU. The additional error reporting information can be included as an error code in a purge path IU, providing information such as a clear subchannel command, halt subchannel command, or a storage exception along with the link error reason codes that resulted in aborting the associated exchange.

Figure 13:
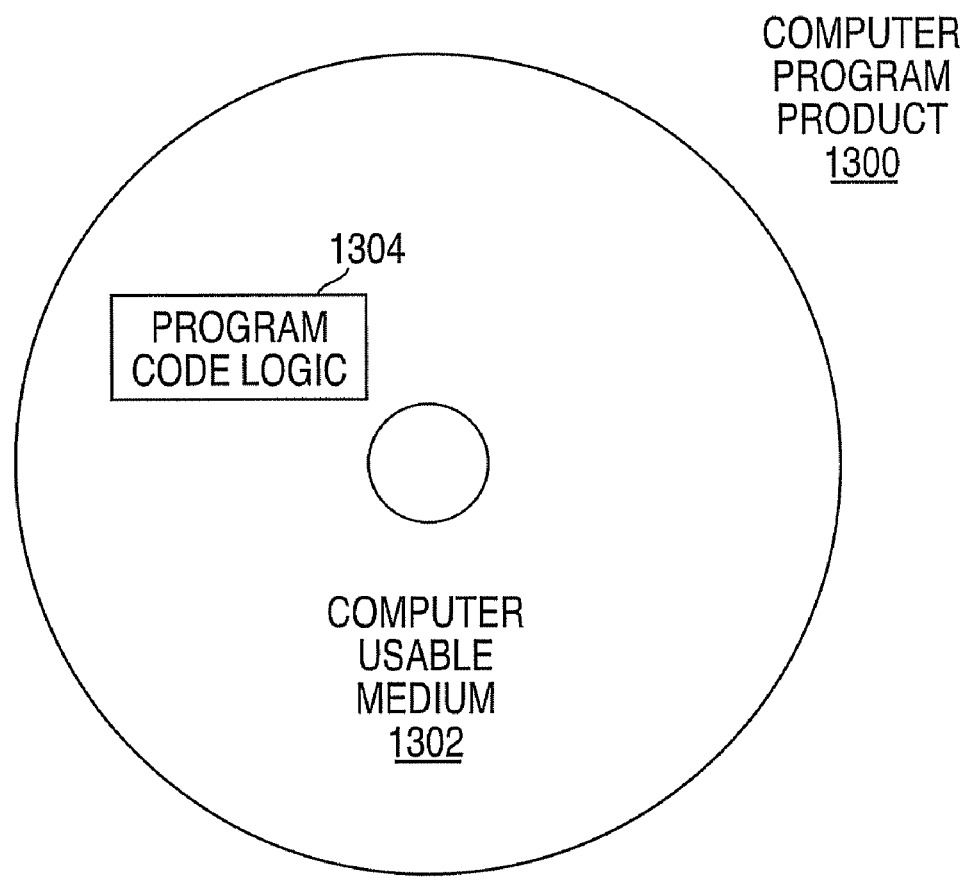
FIG. 13 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1300 as depicted in FIG. 13 on a computer usable medium 1302 with computer program code logic 1304 containing instructions embodied in tangible media as an article of manufacture. Exemplary articles of manufacture for computer usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for handling early termination of an input/output (I/O) operation at a channel subsystem in an I/O processing system, the computer program product comprising:

a tangible storage medium readable by a processing circuit and storing instructions for execution by the processing circuit for performing a method comprising:

opening a first exchange and transmitting a Transport control block (TCCB) to a control unit in communication with the channel subsystem, the TCCB specifying an I/O operation to be performed;

opening a second exchange and transmitting a purge path Information Unit (IU) to the control unit, wherein the purge path IU includes an error code, the error code indicating to the control unit an error condition comprising a clear subchannel command sent from an operating system to the channel subsystem in the I/O processing system, a halt subchannel command sent from the operating system to the channel subsystem, a storage exception occurring due to an error in fetching or storing data in a host storage of a host system or a combination thereof, the host system including the channel subsystem;

receiving from the control unit a purge path response IU associated with the transmitted purge path IU; and responsive to receiving the purge path response IU, transmitting a link level acknowledgment (LACK) to the control unit to close the second exchange.

2. The computer program product of claim 1 wherein the method further comprises transmitting a command on the first exchange to abort the first exchange in response to a request to terminate the I/O operation, wherein opening the second exchange and transmitting the purge path IU is in response to the command to abort the first exchange.

3. The computer program product of claim 2 wherein the abort command is transmitted in a first mode and the method further comprises:

switching communication protocols from the first mode to a second mode; and transmitting a selective reset in a second mode.

4. The computer program product of claim 2, wherein the abort command is a recovery abort of the first exchange.

5. The computer program product of claim 3 wherein the first mode is a transport mode supporting a transport control word (TCW) channel program that includes the transport command control block (TCCB) configured to hold a plurality of commands, and the second mode is a command mode supporting a channel command word (CCW) channel program.

6. The computer program product of claim 1 wherein the method further comprises:

storing primary, secondary and alert status in response to transmitting the purge path command.

7. The computer program product of claim 1, wherein the purge path response IU is received using a third exchange opened and closed as part of a combined sequence.

8. The computer program product of claim 1, wherein the first exchange and the second exchange are mechanisms for transferring information between the channel and the control unit, each of the first exchange and the second exchange being opened for a respective I/O operation and used only for information transfers associated with the respective I/O operation.

9. The computer program product of claim 8, wherein the respective I/O operation associated with the first exchange is a first I/O operation identified by the TCCB, and the respective I/O operation associated with the second exchange is a purge path operation identified by the purge path IU.

10. The computer program product of claim 1, wherein the method further comprises receiving a response from the control unit in the opened first exchange.

11. The computer program product of claim 1 wherein the error code indicates the first exchange was aborted because of at least one of a clear subchannel command and a halt subchannel command.

12. The computer program product of claim 1 wherein the error code indicates the first exchange was aborted because of a storage exception.

13. An apparatus for handling early termination of an input/output (I/O) operation, the apparatus comprising:
  a host computer including an operating system and a channel subsystem, the channel subsystem for communication with a control unit, the channel subsystem including one or more channels for directing information flow between memory and one or more I/O devices via the control unit, and configured to perform a method comprising:
    opening a first exchange and transmitting a Transport control block (TCCB) to the control unit, the TCCB specifying an I/O operation to be performed;
    opening a second exchange and transmitting a purge path Information Unit (IU) to the control unit, wherein the purge path IU includes an error code, the error code indicating to the control unit an error condition comprising a clear subchannel command sent from the operating system to the channel subsystem in the I/O processing system, a halt subchannel command sent from the operating system to the channel subsystem, a storage exception occurring due to an error in fetching or storing data in a host storage of a host system or a combination thereof, the host system including the channel subsystem;
    receiving from the control unit a purge path response IU associated with the transmitted purge path IU; and
    responsive to receiving the purge path response IU, transmitting a link level acknowledgment (LACK) to the control unit to close the second exchange.

14. The apparatus of claim 13, wherein the method further comprises transmitting a command on the first exchange to abort the first exchange in response to a request to terminate the I/O operation, wherein opening the second exchange and transmitting the purge path IU is in response to the command to abort the first exchange.

15. The apparatus of claim 14 wherein the abort command is transmitted in a first mode and the method performed by the channel subsystem further comprises:
  switching communication protocols from the first mode to a second mode; and
  transmitting a selective reset in a second mode.

16. The apparatus of claim 14, wherein the abort command is a recovery abort of the first exchange.

17. The apparatus of claim 15 wherein the first mode is a transport mode supporting a transport control word (TCW) channel program that includes a transport command control block (TCCB) configured to hold a plurality of commands, and the second mode is a command mode supporting a channel command word (CCW) channel program.

18. The apparatus of claim 13 wherein the method performed by the channel subsystem further comprises:
  storing primary, secondary and alert status in response to transmitting the purge path command.

19. The apparatus of claim 13, wherein the purge path response IU is received using a third exchange opened and closed as part of a combined sequence.

20. The apparatus of claim 13, wherein the first exchange and the second exchange are mechanisms for transferring information between the channel and the control unit, each of the first exchange and the second exchange being opened for a respective I/O operation and used only for information transfers associated with the respective I/O operation.

21. The apparatus of claim 20, wherein the respective I/O operation associated with the first exchange is a first I/O operation identified by the TCCB, and the respective I/O operation associated with the second exchange is a purge path operation identified by the purge path IU.

22. The apparatus of claim 13, wherein the method further comprises receiving a response from the control unit in the opened first exchange.

23. The apparatus of claim 13 wherein the error code indicates the first exchange was aborted because of at least one of a clear subchannel command and a halt subchannel command.

24. The apparatus of claim 13 wherein the error code indicates the first exchange was aborted because of a storage exception.

25. A method for handling early termination of an input/output (I/O) operation at a channel subsystem in an I/O processing system, the method comprising:
  opening a first exchange and transmitting a Transport control block (TCCB) to the control unit, the TCCB specifying an I/O operation to be performed;
  opening a second exchange and transmitting a purge path Information Unit (IU) to the control unit, wherein the purge path IU includes an error code, the error code indicating to the control unit an error condition comprising a clear subchannel command sent from an operating system to the channel subsystem in the I/O processing system, a halt subchannel command sent from the operating system to the channel subsystem, a storage exception occurring due to an error in fetching or storing data in a host storage of a host system or a combination thereof, the host system including the channel subsystem;
  receiving from the control unit a purge path response IU associated with the transmitted purge path IU; and
  responsive to receiving the purge path response IU, transmitting a link level acknowledgment (LACK) to the control unit to close the second exchange.

26. The method of claim 25, further comprising transmitting a command on the first exchange to abort the first exchange in response to a request to terminate the I/O operation, wherein opening the second exchange and transmitting the purge path IU is in response to the command to abort the first exchange.

27. The method of claim 26 wherein the abort command is transmitted in a first mode and the method further comprises:
  switching communication protocols from the first mode to a second mode; and
  transmitting a selective reset in a second mode.

28. The method of claim 26, wherein the abort command is a recovery abort of the first exchange.

29. The method of claim 27 wherein the first mode is a transport mode supporting a transport control word (TCW) channel program that includes a transport command control block (TCCB) configured to hold a plurality of commands, and the second mode is a command mode supporting a channel command word (CCW) channel program.

30. The method of claim 25 further comprising:
  storing primary, secondary and alert status in response to transmitting the purge path command.

31. The method of claim 25, wherein the purge path response IU is received using a third exchange opened and closed as part of a combined sequence.

32. The method of claim 25, wherein the first exchange and the second exchange are mechanisms for transferring information between the channel and the control unit, each of the first exchange and the second exchange being opened for a respective I/O operation and used only for information transfers associated with the respective I/O operation.

33. The method of claim 32, wherein the respective I/O operation associated with the first exchange is a first I/O operation identified by the TCCB, and the respective I/O operation associated with the second exchange is a purge path operation identified by the purge path IU.

34. The method of claim 25, further comprising receiving a response from the control unit in the opened first exchange.

35. The method of claim 25 wherein the error code indicates the first exchange was aborted because of at least one of a clear subchannel command and a halt subchannel command.

36. The method of claim 25 wherein the error code indicates the first exchange was aborted because of a storage exception.

* * * * *